Aug. 7, 1928.

A. Y. DODGE

BRAKE

Filed Dec. 17, 1925

1,679,896

INVENTOR
ADIEL Y. DODGE
BY
*M.W.McConkey*
ATTORNEY

Patented Aug. 7, 1928.

1,679,896

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed December 17, 1925. Serial No. 75,904.

This invention relates to brakes, and is illustrated as embodied in an internal expanding friction brake of the "double-wrapping" or "duo-servo" type, in which one part of the brake anchors when the drum is turning in one direction and a different part anchors when the drum is turning in the opposite direction.

An object of the invention is to apply the friction device of such a brake, especially when it consists of a plurality of connected floating shoes, in such a manner that it is more effective for one direction of rotation of the drum than for the other direction of rotation. For example, a toggle or the like is arranged to force against the drum one of the end shoes and an intermediate shoe, instead of the two end shoes as is usual with this type of brake.

Another advantageous feature of the invention relates to operating the brake alternatively by different mechanism, e. g. from the emergency operating connections, to permit which an improved arrangement of over-running joints is provided. Preferably the two mechanisms operate the brake differently,—for example, in one illustrated embodiment the emergency connections apply all the shoes in either direction of movement, whereas the service connections apply only part of the shoes when the movement is in one direction.

Figure 1:
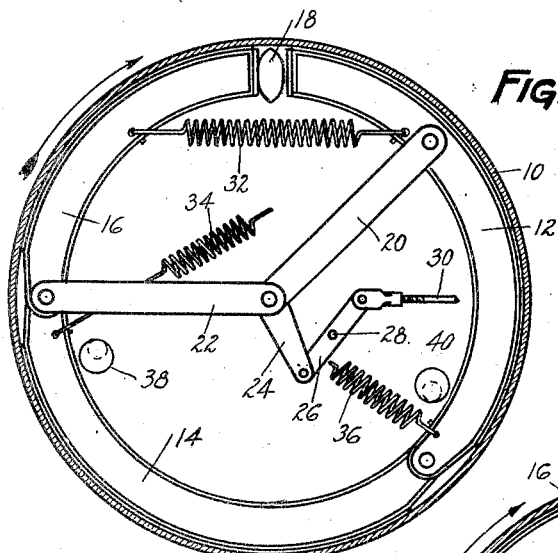
Figure 2:
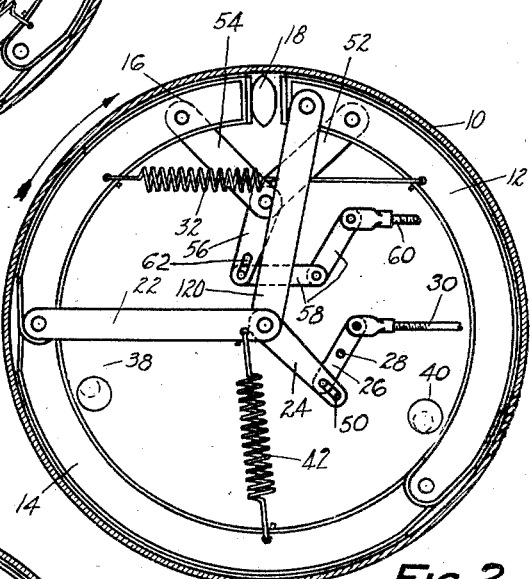
Figure 3:
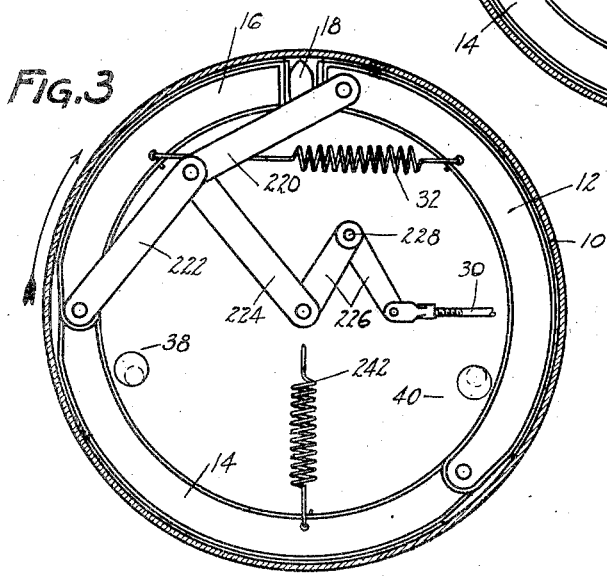

Other features of the invention, including novel arrangements of an anchor which is illustrated as an adjustable cam, and of the return springs and the stops determining the idle position of the friction device, will be apparent from the following description of three illustrative embodiments shown in the accompanying drawing, in which:

Figs. 1, 2, and 3 are all vertical sections, each being through one of the modifications of the brake, and each showing the shoes in side elevation.

Each of the brakes includes a drum 10, and three or more pivotally-connected shoes 12, 14, and 16. Shoes 12 and 14 are shown as being of the same length, shoe 16 preferably being shorter. The brakes are of the "double-wrapping" or "duo-servo" type,— i. e. the shoes float, instead of being anchored at a fixed point. Braking torque is taken by an angularly adjustable cam 18, which is engaged by the end of shoe 12 when the drum is turning counter-clockwise, and by the end of shoe 16 when the drum is turning clockwise. The adjustment of cam 18 is to maintain approximately constant lost motion in the brake, as the lining wears.

The brake of Fig. 1 is applied by a toggle including a link 20 pivotally connected to shoe 12, and a link 22 pivoted at its end to the pivotal connection between shoes 16 and 14. The toggle is operatively connected by a link or links 24 to one end of an operating lever 26 fulcrumed at 28, and having a connection 30 with the rest of the brake-applying mechanism.

The primary operating mechanism of the brake of Fig. 2 differs from that of Fig. 1 only in that link 120, corresponding to link 20, is connected to the end of shoe 12 instead of to an intermediate part.

In Fig. 3, the toggle 220—222 is reversed with respect to the toggle 120—22 of Fig. 2, and is operated by tension on a link 224 from a bellcrank lever 226 fulcrumed at 228 and operated by the connection 30.

The return springs of the brake of Fig. 1 include a spring 32 tensioned between shoes 12 and 16, and two auxiliary springs 34 and 36. The three springs urge the shoes toward idle positions determined by anchor 18 and by two eccentric adjustable stops 38 and 40, spaced approximately 120° on each side of anchor 18.

In Fig. 2, return spring 32 is aided by a single auxiliary spring 42, connected at one end to shoe 14 half-way between stops 38 and 40, and connected at the other end to one of the links immediately adjacent the knuckle of the toggle.

In Fig. 3, spring 242 is connected to a stationary part at one end, instead of to the toggle.

In all of the forms illustrated, pressure on the toggle forces against the drum 10 the shoe 12 and the counter-clockwise end of shoe 14. Thus shoe 16 is effective when the drum is turning counter-clockwise, but is entirely idle when the drum is turning clockwise.

If desired, the brakes may be arranged to be applied alternatively by emergency connections. One arrangement for this purpose, which is applicable to any of the three brakes, is illustrated in Fig. 2. In this arrangement, link 24 is formed with a slot 50 engaging a pin on the end of lever 26, thus forming an over-running connection permitting lever 26 to remain idle when the emergency connections are used. As in Fig. 2 the brake is shown applied by lever 26, the pin is in the upper end of slot 50.

At the unconnected ends of shoes 12 and 16, i. e. the ends next the anchor 18, additional operating means such as toggle links 52 and 54 are provided. These links are operated by a connecting link 56 from a lever 58 connected by a rod 60 to the usual emergency connections. It will be seen that toggle 52—54 applies all three shoes whichever direction drum 10 may be turning. Link 56 has a slot 62 to provide an overrunning joint, so that lever 58 is not moved when the brake is applied by lever 26. Since in this figure the brake is shown applied by lever 26, the pin carried by lever 58 is in the lower end of slot 62.

While several illustrative embodiments have been described in detail, it is not my intention to limit the scope of the invention to those particular embodiments, or otherwise than by the terms of the appended claims.

I claim:

1. A brake comprising, in combination with a drum, a friction device having a plurality of sections all engaging the same zone of the drum and effective in both directions of rotation of the drum, and brake-applying means for forcing the friction device against the drum, the friction device and the brake-applying means being so constructed and so arranged that at least one section of the friction device engages the drum when the drum is turning in one direction but does not engage it when it is turning in the opposite direction.

2. A brake comprising, in combination with a drum, a friction device effective in both directions of rotation of the drum and engaging a single zone of the drum, and brake-applying means for forcing the friction device against the drum, the friction device and the brake-applying means being so constructed and so arranged that all of the friction device is effective when the drum is turning in one direction and a part only is effective when the drum is turning in the opposite direction.

3. A brake comprising, in combination with a drum and anchoring means, a friction device arranged to have one part anchor on said means when the drum is turning in one direction and to have a different part anchor on said means when the drum is turning in the opposite direction, each of said parts leaving the anchoring means when the other part is anchored, and means for forcing the friction device against the drum so arranged that a greater part of the friction device is effective when the first part is anchored than when said different part is anchored.

4. A brake comprising, in combination with a drum and an anchor, a friction device arranged to have one end engage said anchor when the drum is turning in one direction and to have the other end engage said anchor when the drum is turning in the opposite direction, and means for forcing the friction device against the drum so arranged that a greater part of the friction device is effective when one end is anchored than when the other end is anchored.

5. A brake comprising, in combination with a drum and anchoring means, connected shoes shiftable in such a manner that one shoe anchors against said means when the drum is turning in one direction and a different shoe anchors against said means when the drum is turning in the opposite direction, and means for forcing the shoes against the drum, a different number of shoes being effective when the drum is turning in one direction than when it is turning in the other direction.

6. A brake comprising, in combination with a drum and anchoring means, connected shoes shiftable in such a manner that one shoe anchors against said means when the drum is turning in one direction and a different shoe anchors against said means when the drum is turning in the opposite direction, and means for forcing the shoes against the drum, one of the shoes being effective when the drum is turning in one direction and ineffective when the drum is turning in the opposite direction.

7. A brake comprising, in combination with a drum, a floating friction device extending substantially the entire circumference of the drum, and brake-applying means for forcing toward the drum one end of said device and an intermediate part of said device.

8. A brake comprising, in combination with a drum, a floating friction device extending substantially the entire circumference of the drum and including a plurality of connected shoes, and brake-applying means for forcing toward the drum one end shoe and an intermediate shoe.

9. A brake comprising, in combination with a drum, a floating friction device extending substantially the entire circumference of the drum and including a plurality of connected shoes, brake-applying means for forcing toward the drum one end shoe and an intermediate shoe, and anchoring means engageable by one or the other of the end shoes according to the direction of rotation of the drum.

10. A brake comprising, in combination with a drum, a floating friction device extending substantially the entire circumference of the drum and including a plurality of connected shoes, brake-applying means for forcing toward the drum one end shoe and an intermediate shoe, and an anchor between and engageable by one or the other of the end shoes according to the direction of rotation of the drum.

11. A brake comprising, in combination with a drum, a floating friction device extending substantially the entire circumference of the drum and including a plurality of connected shoes, brake-applying means for forcing toward the drum one end shoe and an intermediate shoe, and an adjustable anchor arranged between the two end shoes.

12. A brake comprising, in combination with a drum, a floating friction device extending substantially the entire circumference of the drum and including a plurality of connected shoes, brake-applying means for forcing toward the drum one end shoe and an intermediate shoe, and a stationary adjustable cam arranged between the two end shoes and serving as an anchor.

13. A brake comprising, in combination with a drum, a floating friction device extending substantially the entire circumference of the drum and including a plurality of connected shoes, brake-applying means for forcing toward the drum one end shoe and an intermediate shoe, and a plurality of return springs, one connecting the two end shoes and another urging said intermediate shoe away from the drum.

14. A brake comprising, in combination with a drum, a floating friction device extending substantially the entire circumference of the drum and including a plurality of connected shoes, brake-applying means for forcing toward the drum one end shoe and an intermediate shoe, and a plurality of return springs urging the two end shoes and said intermediate shoe away from the drum.

15. A brake comprising, in combination with a drum, a floating friction device extending substantially the entire circumference of the drum and including a plurality of connected shoes, brake-applying means for forcing toward the drum one end shoe and an intermediate shoe, and a tension spring connecting said intermediate shoe and the brake-applying means and urging both toward their idle positions.

16. A brake comprising, in combination with a drum, a plurality of connected floating shoes within the drum, a toggle connected at one end to one end shoe and at the other end to the connected ends of the other end shoe and the adjacent shoe, and brake-applying means acting on the knuckle of said toggle.

17. A brake comprising, in combination with a drum, a plurality of connected floating shoes within the drum, a toggle connected at one end to one end shoe and at the other end to the connected ends of the other end shoe and the adjacent shoe, and a brake-applying lever linked to said toggle.

18. A brake comprising, in combination with a drum and anchoring means, connected shoes shiftable in such a manner that one shoe anchors against said means when the drum is turning in one direction and a different shoe anchors against said means when the drum is turning in the opposite direction, and means for forcing the shoes against the drum, one of the shoes being effective when the drum is turning in one direction and ineffective when the drum is turning in the opposite direction, said last-named shoe being substantially shorter than the other shoes.

19. A brake comprising, in combination with a drum, a floating friction device extending substantially the entire circumference of the drum and including a plurality of connected shoes, and brake-applying means for forcing toward the drum one end shoe and an intermediate shoe, the other end shoe being shorter than the shoes acted on by the brake-applying means.

20. A brake comprising, in combination with a drum, three connected floating shoes within the drum, two being slightly longer than 120° and the third being shorter, and a pair of stops spaced approximately 120° on opposite sides of the anchor and engaging the longer shoes near their ends.

21. A brake comprising, in combination with a drum, three connected floating shoes within the drum, two being slightly longer than 120° and the third being shorter, and a pair of eccentric adjustable stops spaced approximately 120° on opposite sides of the anchor and engaging the longer shoes near their ends.

22. A brake comprising, in combination, a drum, a friction device engageable with the drum, and a plurality of sets of operating connections for said friction device, one applying the entire friction device in either direction of rotation of the drum and the other applying the entire friction device in one direction of rotation of the drum and a part only of the friction device in the other direction of rotation of the drum.

23. A brake comprising, in combination, a drum, a friction device including a set of shoes engageable with the drum, and a plurality of sets of operating connections for said friction device, one applying all of the shoes in either direction of rotation of the drum, and the other applying all of the shoes in one direction of rotation of the drum and a part only of the shoes in the other direction of rotation of the drum.

24. A brake comprising, in combination with a drum and anchoring means, a friction device arranged to have one part anchor on said means when the drum is turning in one direction and to have a different part anchor on said means when the drum is turning in the opposite direction, and a plurality of sets of operating connections for said friction device, one arranged to apply the entire friction device in either direction of rotation of the drum, and the other arranged to apply the entire friction device in one direction of rotation of the drum and to apply a part only of the friction device in the opposite direction of rotation of the drum.

25. A brake comprising, in combination with a drum and anchoring means, a friction device arranged to have one part anchor on said means when the drum is turning in one direction and to have a different part anchor on said means when the drum is turning in the opposite direction, and a plurality of sets of operating connections for said friction device, one arranged to apply the entire friction device, and the other arranged to apply a part only of the friction device at least in one direction of rotation of the drum.

26. A brake comprising, in combination with a drum and anchoring means, connected shoes shiftable in such a manner that one shoe anchors against said means when the drum is turning in one direction and a different shoe anchors against said means when the drum is turning in the opposite direction, and two different means for forcing said shoes against the drum, one arranged to force all of the shoes against the drum in either direction of rotation of the drum, and the other arranged to force all of the shoes against the drum in one direction of rotation of the drum and a part only of the shoes in the opposite direction.

27. A brake comprising, in combination with a drum and anchoring means, connected shoes shiftable in such a manner that one shoe anchors against said means when the drum is turning in one direction and a different shoe anchors against said means when the drum is turning in the opposite direction, and two different means for forcing said shoes against the drum, one arranged to force all of the shoes against the drum, and the other arranged to force a part only of the shoes against the drum at least in one direction of rotation of the drum.

28. A brake comprising, in combination with a drum and anchoring means, connected shoes shiftable in such a manner that one shoe anchors against said means when the drum is turning in one direction and a different shoe anchors against said means when the drum is turning in the opposite direction, and two independently-operable sets of connections for forcing the shoes against the drum.

29. A brake comprising, in combination with a drum and anchoring means, connected shoes shiftable in such a manner that one shoe anchors against said means when the drum is turning in one direction and a different shoe anchors against said means when the drum is turning in the opposite direction, and two independently-operable sets of connections for forcing the shoes against the drum, each set including an over-running connection to facilitate the operation of the other set.

30. A brake comprising, in combination with a drum and anchoring means, connected shoes shiftable in such a manner that one shoe anchors against said means when the drum is turning in one direction and a different shoe anchors against said means when the drum is turning in the opposite direction, and two independently-operable sets of connections for forcing the shoes against the drum, each set including an over-running connection to facilitate the operation of the other set, the over-running connections being within the circumference of the drum.

31. A brake comprising, in combination, a drum, friction means engageable with the drum, and two independent operating connections for the brake arranged to force the friction means against the drum and each including an over-running connection immediately adjacent the brake and within the circumference of the drum.

In testimony whereof, I have hereunto signed my name.

ADIEL Y. DODGE